US011828990B2

(12) United States Patent
Shikama et al.

(10) Patent No.: US 11,828,990 B2
(45) Date of Patent: Nov. 28, 2023

(54) OPTICAL CONNECTOR AND OPTICAL CONNECTING STRUCTURE

(71) Applicant: Nippon Telegraph and Telephone Corporation, Tokyo (JP)

(72) Inventors: Kota Shikama, Tokyo (JP); Norio Sato, Tokyo (JP); Takeshi Sakamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/772,616

(22) PCT Filed: Nov. 28, 2019

(86) PCT No.: PCT/JP2019/046617
§ 371 (c)(1),
(2) Date: Apr. 28, 2022

(87) PCT Pub. No.: WO2021/106157
PCT Pub. Date: Jun. 3, 2021

(65) Prior Publication Data
US 2022/0365290 A1    Nov. 17, 2022

(51) Int. Cl.
*G02B 6/38*    (2006.01)
(52) U.S. Cl.
CPC ................... *G02B 6/3886* (2013.01)

(58) Field of Classification Search
CPC .................................................. G02B 6/3886
See application file for complete search history.

(56) References Cited

FOREIGN PATENT DOCUMENTS

| JP | 56067813 A | * | 6/1981 | ........... G02B 6/3886 |
|---|---|---|---|---|
| JP | S5667813 A | | 6/1981 | |
| JP | 2001215362 A | | 8/2001 | |
| JP | 2011118329 A | | 6/2011 | |

OTHER PUBLICATIONS

Abe et al., "Physical-contact-type fan-out device for multicore fibre," Electronics Letters, vol. 49, No. 11, May 23, 2013, 2 pages.
Nagase et al., "World-class R&D results," NTT Technical Journal 2007.12, pp. 74-78, 10 pages total.

* cited by examiner

*Primary Examiner* — Sung H Pak
(74) *Attorney, Agent, or Firm* — Slater Matsil, LLP

(57) ABSTRACT

An optical connector of the present invention includes a ferrule accommodating optical fibers, a flange integrated with the ferrule, a sleeve in which a pair of the ferrules are accommodated, and a connection component which is provided around the sleeve and includes a magnet or a metallic magnetic material, wherein at least one of the connection component and the flange includes a magnet, and an attractive force acts on the connection component and the flanges, whereby cores of the opposing optical fibers come into close contact with each other. As a result, the optical connector of the present invention can provide the present physical contact connection and can provide a smaller optical connector.

14 Claims, 19 Drawing Sheets

110

OPTICAL CONNECTOR AND OPTICAL CONNECTING STRUCTURE

CROSS-REFERENCE TO RELATED APPLICATIONS

This application is a national phase entry of PCT Application No. PCT/JP2019/046617, filed on Nov. 28, 2019, which application is hereby incorporated herein by reference.

TECHNICAL FIELD

The present invention relates to an optical fiber connection component, and more particularly to an optical connector and an optical connection structure in which optical fibers are held and pressed together by a magnet to achieve reduction in size.

BACKGROUND

In recent years, there has been a demand for a significant increase in communication capacity within and between data centers with increases in traffic due to video services, the Internet of things (IoTs), cloud services, and the like. In order to achieve the increase in communication capacity, instead of a conventional short-distance communication method using electric signals, introduction of an optical interconnection technique using an optical transmission technique used in optical communication, or the like is progressing.

In this optical interconnection technique, a form of an optical transceiver called a pluggable transceiver is often used. In a pluggable transceiver, various optical components such as an optical transceiver, an electric circuit component for controlling them, a printed circuit board, and the like are accommodated in a metal housing. Further, the housing is provided with a guide structure through which an optical connector is inserted and removed from the outside, and by inserting the optical connector suitable for the guide structure, it is possible to optically couple it with the optical transceiver in the housing.

As described above, a size of the pluggable transceiver is becoming smaller year by year with the need for increased communication capacity, and the housing has been downsized to the same extent as the guide structure for the optical connector. For that reason, in order to further reduce a size of the housing in the future, a guide mechanism is also required to be downsized, that is, the size of the optical connector suitable for the guide mechanism is required to be further downsized.

In addition, there is also a use of connecting optical fibers to each other in the small housing, and as small an optical connector as possible is also required for this use. Further, introduction of optical interconnection on a board without the housing is expected to progress in the future, and even in that case, there is a growing demand for a small optical connector in order to reduce an area occupied by an optical connection portion on the board.

CITATION LIST

Non Patent Literature

NPL 1: Ryo Nagase, Kazuo Hokari, "Optical Connector," NTT Technical Journal, December 2007, pp. 74-78.

NPL 2: Y. Abe, K. Shikama, S. Yanagi, and T. Takahashi, "Physical-contact-type fan-out device for multicore fibre," Electronics Letters, vol. 49, Issue 11, pp. 711-712, 2013.

SUMMARY

Technical Problem

Generally, as an optical connector for connecting optical fibers, such as an optical connector for a pluggable transceiver, one using a cylindrical ferrule represented by an SC connector or an LC connector is known.

As described in NPL 1, a cylindrical ferrule is provided with a hole along a central axis thereof, which is slightly larger than an outer diameter of a clad of an optical fiber, the optical fiber is adhesively fixed, and its tip is spherically polished.

In addition, the ferrule is integrated with a metal component called a flange by press fitting. A coil spring is provided behind the flange on a side opposite to a ferrule end, and the optical connector is composed of a stop ring component that integrates the coil spring and the flange so that they do not fall off, and a plastic housing component disposed to surround peripheries thereof. Ferrules are inserted into a split sleeve in an adaptor, and an adapter housing and the connector housing are mechanically fastened, thereby connecting the optical fibers to each other.

In this case, the ferrules are pressed against each other due to a compression force by the spring in the split sleeve. Due to this pressing, the optical fibers in the ferrules can be closely connected to each other, and Fresnel reflection generated by air can be prevented. Such a connection method is called a physical contact connection (hereinafter referred to as "PC connection"), and the PC connection technique using a ferrule and a spring is a widely used method for an optical connector.

However, since the optical connector of the present structure uses a mechanical fastening structure such as a spring component or a housing component, there is a limit to reduction in size. As described in NPL 2, as one approach for reduction in size, a structure in which a housing component is eliminated, ferrules integrated with flanges are inserted into a split sleeve, and the flanges are sandwiched with a leaf spring, thereby realizing a pressing force required for the PC connection, has been proposed. However, such a method using a leaf spring has problems such as a large size of an external leaf spring component and deterioration of operability during insertion and removal.

Embodiments of the present invention have been made to solve the above problems, and an object of the embodiments of the present invention is to provide a small-sized optical connector capable of realizing PC connection without using a mechanical fastening component or a spring component.

Means for Solving the Problem

In order to solve the problems described above, an optical connector according to embodiments of the present invention is an optical connector for connecting optical fibers each having a waveguide core surrounded by a clad to face each other. The optical connector includes a ferrule configured to accommodate the optical fiber, the ferrule having a cylindrical shape and including a guide hole; a flange disposed on an optical fiber extraction side at one ends of the guide holes and integrated with the ferrules; and a sleeve in which a pair of the ferrules are accommodated to face each other such that central axes of the ferrules coincide with each other, wherein a connection component including a magnet or a metallic magnetic material is provided around the sleeve, at least one of the connection component and the flanges includes a magnet, a length of the connection component with respect to an axial direction of the optical fiber is set to be the same as or a predetermined distance shorter than a sum of lengths of the two ferrules protruding from the flanges, and due to an attractive force acting on the connection component and the flange, cores of the plurality of fibers facing each other come in close contact with each other.

Effects of Embodiments of the Invention

According to embodiments of the present invention, it is possible to realize a physical contact connection, and to realize a smaller optical connector.

DETAILED DESCRIPTION OF ILLUSTRATIVE EMBODIMENTS

First Embodiment

Hereinafter, an optical connector 100 according to a first embodiment of the present invention will be described with reference to FIGS. 1 to 5.

Figure 1:
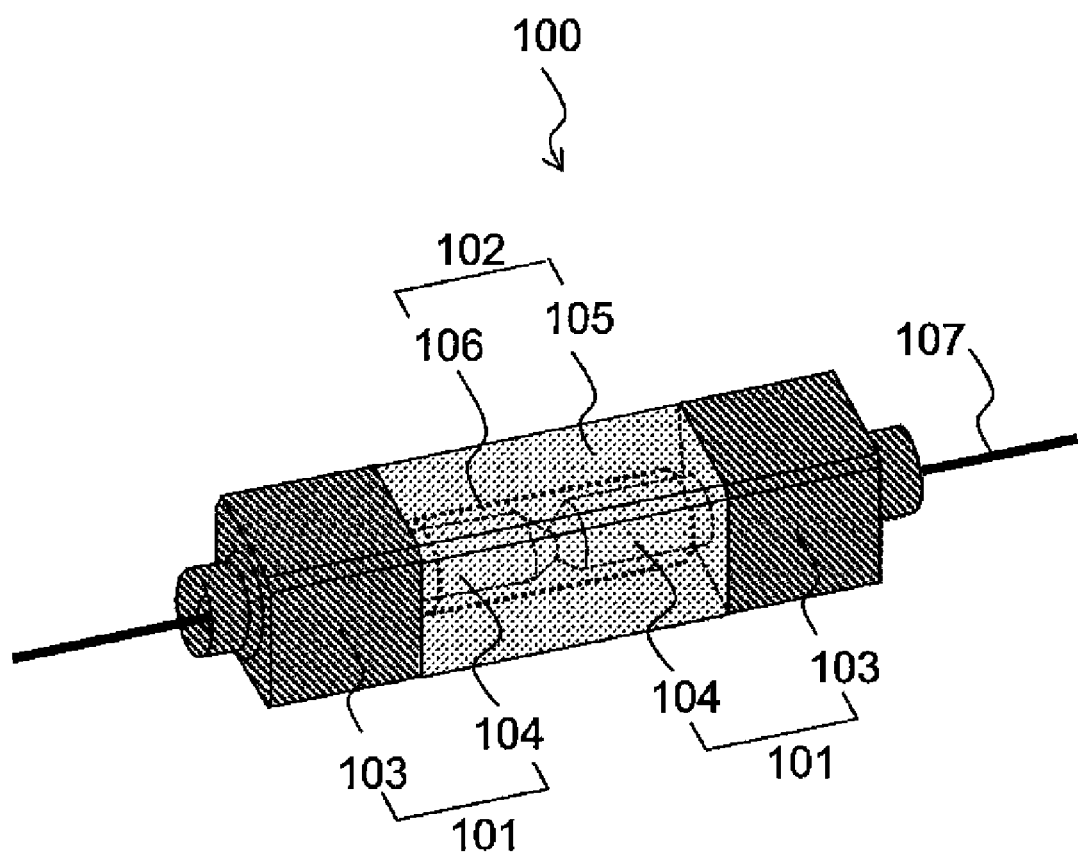
FIG. 1 is a perspective view of an optical connector according to a first embodiment of the present invention.
Figure 2:
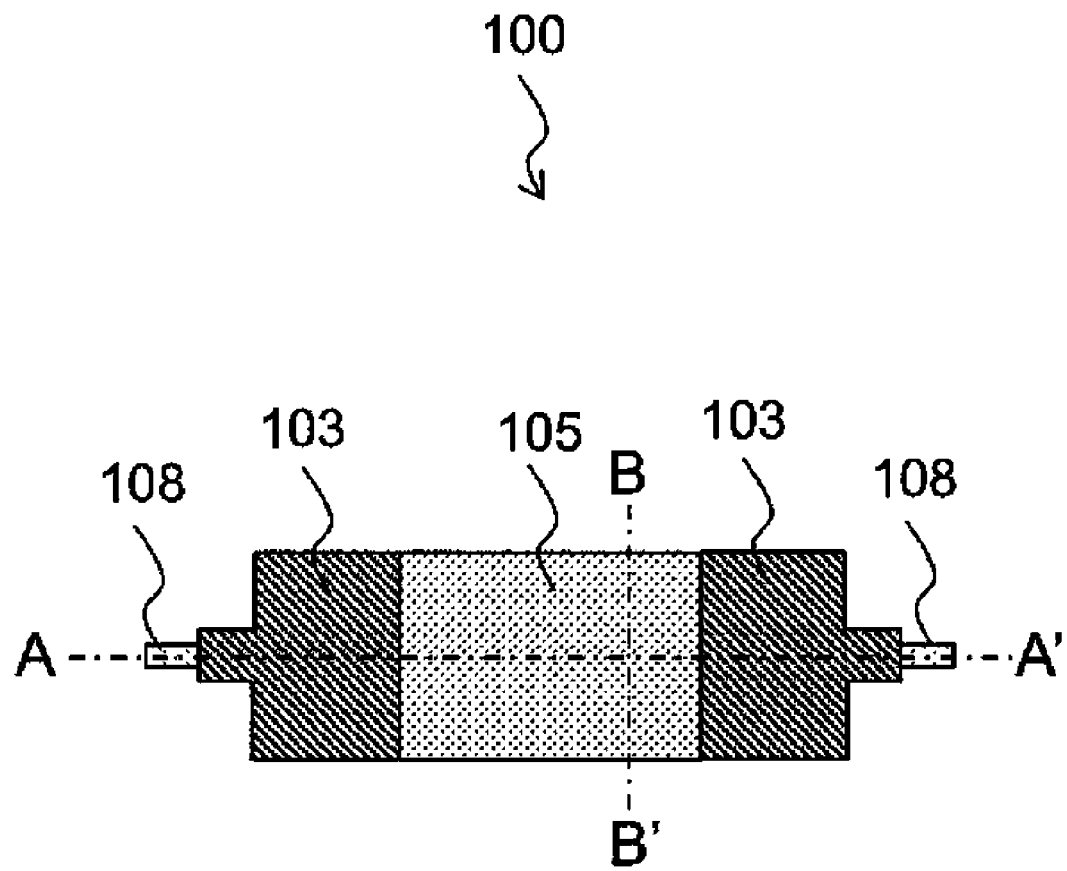
FIG. 2 is a top view of the optical connector according to the first embodiment of the present invention.
Figure 3A:
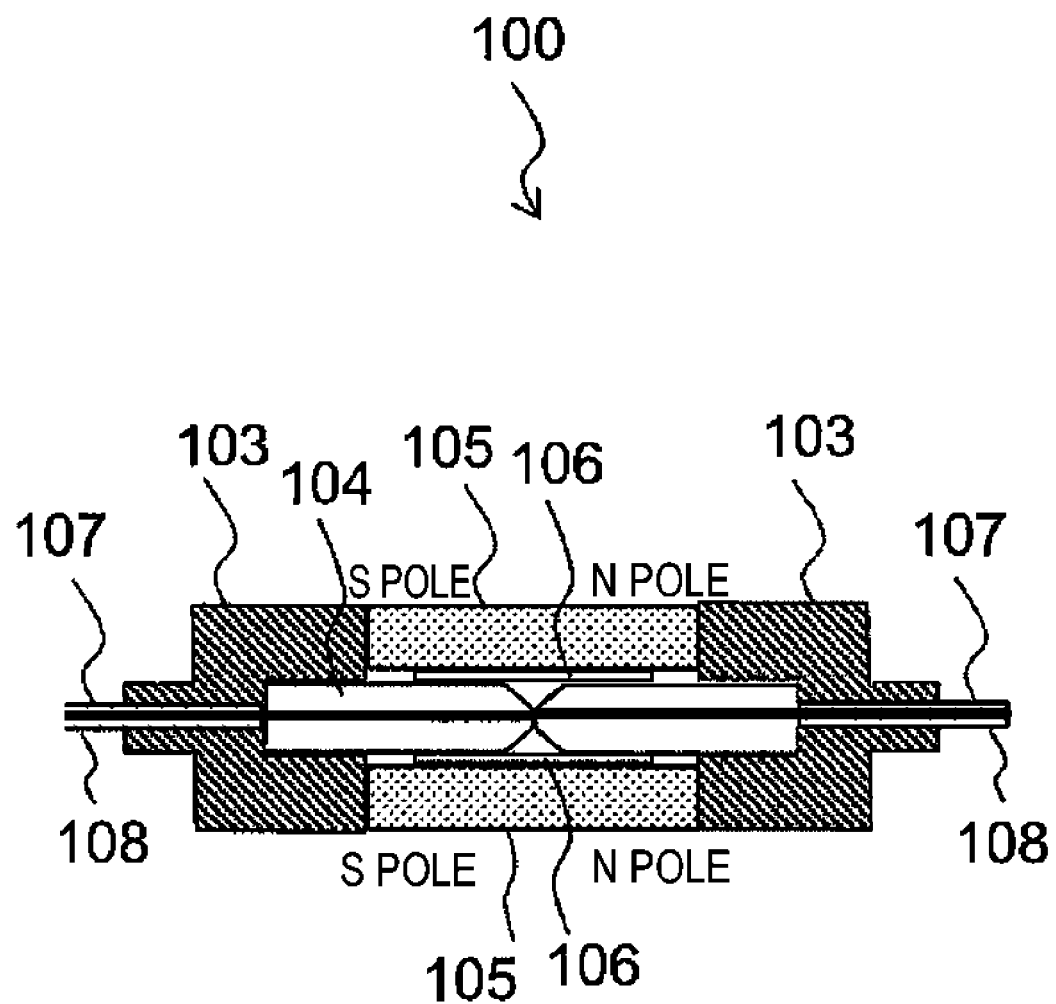
FIG. 3A is a cross-sectional view (A-A') of the optical connector according to the first embodiment of the present invention.
Figure 3B:
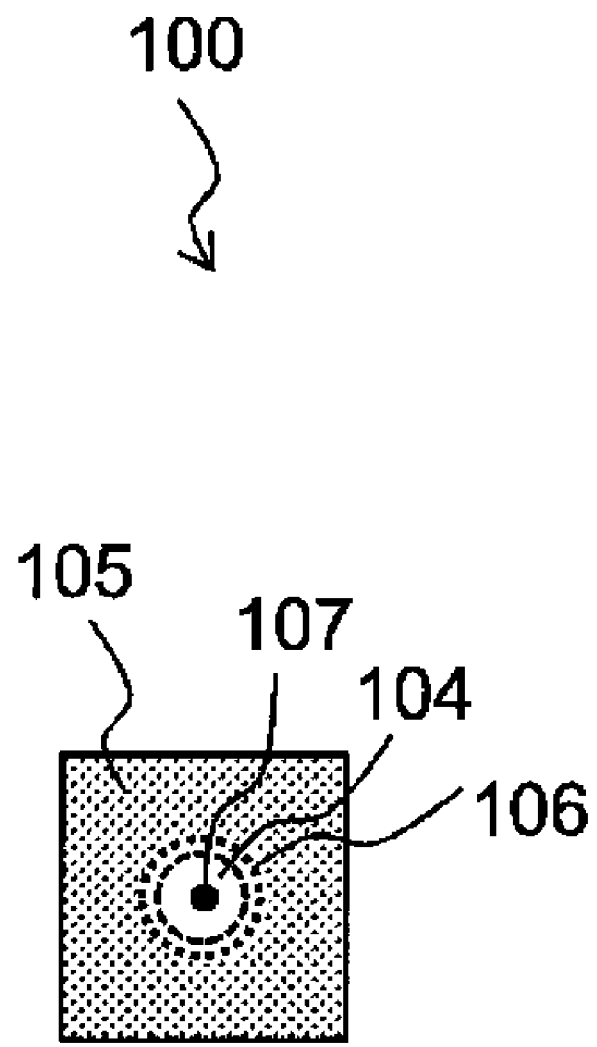
FIG. 3B is a cross-sectional view (B-B') of the optical connector according to the first embodiment of the present invention.

FIG. 1 is a perspective view of the optical connector 100 according to the first embodiment of the present invention, and FIG. 2 is a top view thereof. In FIG. 2, a plane that includes a central axis and is perpendicular to a top surface of the optical connector 100 is indicated by A-A' (hereinafter referred to as an "A vertical plane"). With respect to the "A vertical plane", a plane including the central axis and parallel to the top surface of the optical connector 100 is hereinafter referred to as an "A parallel plane." Further, a plane perpendicular to the central axis and perpendicular to the top surface of the optical connector 100 is indicated by B-B' (hereinafter referred to as a "B vertical plane"). In addition, hereinafter, in the description of embodiments of the present invention, a direction parallel to A-A', that is, an axial direction of an optical fiber 107, is defined as an A direction and a direction parallel to B-B' is defined as a B direction. Further, FIG. 3A is a cross-sectional view (A-A') on the A vertical plane, and FIG. 3B is a cross-sectional view (B-B') on the B vertical plane. Here, the central axis is substantially the same as a central axis of the optical fiber 107.

The optical connector 100 includes optical connector plugs 101 each including a flange 103 and a ferrule 104, and an optical connector adapter 102 including a connection component 105 and a sleeve 106. As illustrated in FIG. 1, the optical connector 100 has a structure in which the optical connector plugs 101 are accommodated in the sleeve 106 inside the optical connector adapter 102 to face each other and are butted against each other, whereby optical fibers 107 are connected to each other.

In each of the optical connector plugs 101, a base end of the ferrule 104 is mounted in the flange 103 by press-fitting. A surface of the optical fiber 107 is coated (with an optical fiber coating 108), and the optical fiber coating 108 is removed in the ferrule 104. The ferrule 104 includes a micro hole (insertion hole) having an inner diameter slightly larger than an outer diameter of the optical fiber 107 on a central axis thereof. The optical fiber 107 from which the coating is removed is accommodated in the micro hole, and the optical fiber 107 and the ferrule 104 as well as the optical fiber 107 and the flange 103 are fixed and bonded with an adhesive. Note that, the adhesive is not illustrated in the figures. Tips of the optical fiber 107 and the ferrule 104 are polished into convex spherical shapes and are appropriately polished in a shape suitable for PC connection.

In the optical connector adapter 102, the sleeve 106 is disposed in a through hole of the connection component 105. As described above, by accommodating the optical connector plugs 101 in the sleeve 106 inside the optical connector adapter 102 to face each other, a pair of ferrules 104 are accommodated from both sides of the sleeve 106, and the optical fibers 107 are connected to face each other.

Note that, in embodiments of the present invention, any known type and material of the optical fibers 107, and any known type and material of the ferrules 104 can be used. For example, the optical fiber 107 may be a quartz-based optical fiber or a plastic optical fiber, and any of zirconia, crystallized glass, borosilicate glass, plastic, or the like may be used for the ferrule 104. In addition, although the coating 108 is provided around the optical fiber 107, a known tube, nylon coating, or the like may be further provided in two or more layers around the optical fiber 107.

Further, for the sleeve 106, either a sleeve having a cylindrical shape and having an inner diameter slightly larger than an outer diameter of the ferrule 104, or a split sleeve having an inner diameter slightly smaller than the outer diameter of the ferrule 104 and having a split in the A direction may be used. Further, for a material of the sleeve, the same effect can be realized by using any of zirconia, a metal, plastic and the like.

The sleeve 106 is fixed in the through hole formed on a substantially central axis of the connection component 105. The ferrule 104 in which the optical fiber 107 is mounted is provided in the sleeve 106.

Here, the connection component 105 is composed of a permanent magnet. As a material of the permanent magnet, any known magnet may be used depending on a magnetic force to be realized. For example, it is a neodymium magnet. In addition thereto, a ferrite magnet, an alnico magnet, a samarium cobalt magnet, KS steel, MK steel, a neodymium iron boron magnet, or the like can be used. Here, as illustrated in FIG. 2, the connection component 105 composed of a permanent magnet is magnetized to an N pole and an S pole in the A direction.

Further, the flange 103 is made of a metal magnetic material. For example, a material that is inexpensive and excellent in machining is SUS430. In addition, iron, nickel, cobalt, or a material having magnetism such as stainless steel (SUS) that is an iron-based alloy can be used. Further, as will be described later in a second embodiment, a permanent magnet may be used for the flange 103. Further, in a case in which the flange 103 is a permanent magnet, a metal magnetic material as described above, a known soft magnetic material, or the like may be used for the connection components 105.

By adopting this structure, the following effects are achieved. In a conventional optical connector, in order to achieve PC connection in which a gap between cores of optical fibers is eliminated to keep them in close contact with each other, it is necessary to use a coil spring or a leaf spring at an end portion of a flange on an extraction side of an optical fiber. Thus, a mechanical fastening component for resisting a reaction force of the spring is required.

On the other hand, in the structure according to the present embodiment, it is possible to apply a pressing force for bringing the optical fibers 107 at ends of the ferrules 104 into close contact with each other, using an attractive force generated by the magnet without using an elastic force such as a spring or the like. Thus, since the attractive force caused by the magnet also realizes an effect of holding members, stable PC connection can be maintained even without a mechanical fastening component for resisting the reaction force of the spring. That is, since the number of members can be reduced, it is possible to achieve reduction in size of the optical connector while maintaining the PC connection.

Here, opposing surfaces of the connection component 105 and the flanges 103 are preferably parallel to each other in order to stabilize vectors of the attractive force caused by the magnet in the A direction.

In addition, the opposing surfaces of the connection component 105 and the flanges 103 are preferably perpendicular to the A direction from the same viewpoint as described above. However, the ferrules 104 are accommodated in the same sleeve 106 even in a case in which the parallel and perpendicular characteristics are not perfect, and thus if a clearance between the outer diameters of the ferrules 104 and the inner diameter of the sleeve 106 is set to be small, a butting angle of the ferrules 104 in the A direction does not deviate significantly, and a decrease in optical coupling loss can be ignored. That is, good optical characteristics can be achieved even with parallel and orthogonal degrees with which practical machining accuracy can be ensured.

In addition, a length of the connection component 105 in the A direction is set to be equal to or a predetermined length shorter than a sum of lengths of the ferrules 104 protruding from the respective flanges 103. Thus, it has a structure in which tips of the ferrules 104 can always come into contact with each other.

Here, in a case in which the length of the connection component 105 is shorter than the sum of the lengths of the ferrules 104, a gap is generated between the opposing surfaces of the connection component 105 and the flanges 103. In general, when the gap becomes larger, the attractive force caused by the magnet decreases, but if the gap is equal to or less than approximately 0.3 mm, which can be sufficiently ensured with practical machining accuracy, the attractive force does not decrease significantly. Accordingly, it is desirable that the length of the connection component 105 be equal to the sum of the protruding lengths of the ferrules 104 or about 0.3 mm shorter than the sum of the protruding lengths of the ferrules 104.

Materials and sizes of the magnet and the magnetic material may be set in view of the above gap and the pressing force required for the PC connection. Practically, when a pressing force of approximately 1 N or greater is realized between the connection component 105 and the flanges 103, the PC connection can be stably realized. In calculation of a magnetic force between the connection component 105 and the flanges 103, it was found that if the size of the magnet is set to approximately 3×3×3 mm$^3$ when the magnet material is a neodymium magnet and the flange 103 is SUS430, a pressing force of approximately 3 N as mentioned above can be sufficiently realized.

Figure 4:
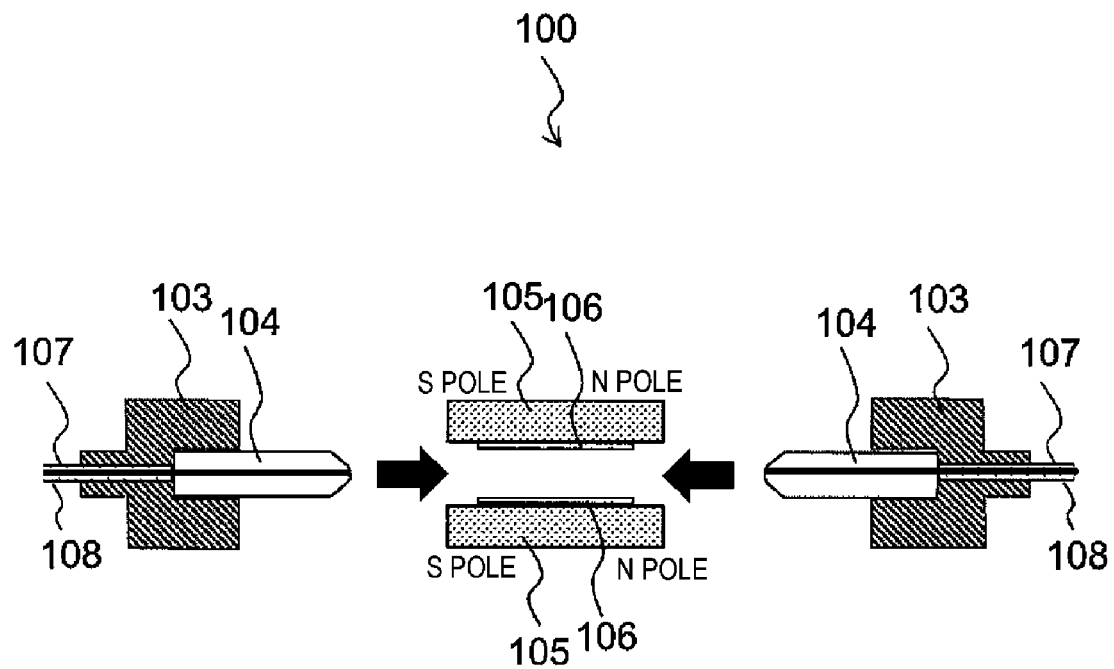
FIG. 4 is a cross-sectional view (A-A') illustrating an aspect of assembling the optical connector according to the first embodiment of the present invention.

The optical connector 100 according to the present embodiment was prototyped. A SUS430 flange was used for the flange 103, a zirconia ferrule having an outer diameter of 1.25 mmφ was used for the ferrule 104, and a quartz-based single-mode optical fiber was used for the optical fiber 107. A neodymium magnet was used for the connection component 105. The length of the connection component 105 was 3.2 mm, and the protruding length of the ferrule 104 was approximately 1.65 mm. As illustrated in FIG. 4, it was confirmed that when the ferrules 104 to which the optical fibers 107 were fixed and bonded were faced each other and connected via the sleeve 106, the PC connection could be realized.

Further, the coupling loss at this time is 0.1 dB, and this value is achieved by high dimensional accuracy of the sleeve 106 and the ferrules 104. In addition, it was confirmed that the reflection attenuation was 50 dB or more, and optical characteristics comparable to those of conventional optical connectors can be realized.

The size of the optical connector 100 according to the present embodiment is 3 mm×3 mm in the size of a cross-section on the B vertical plane and 9 mm in length.

Since a size of a conventional small optical connector such as an LC type is 7 mm×9 mm in the size of the cross-section in the B vertical plane and 30 mm in length, the optical connector according to the present embodiment can realize a significant reduction in size. Here, the size of the optical connector 100 can be set to be 2 mm×2 mm or more and 6 mm×6 mm or less in the size of the cross-section on the B vertical plane and 6 mm or more and 10 mm or less in length.

Modified Example of First Embodiment

Next, a modified example of the optical connector according to the first embodiment will be described.

Figure 5:
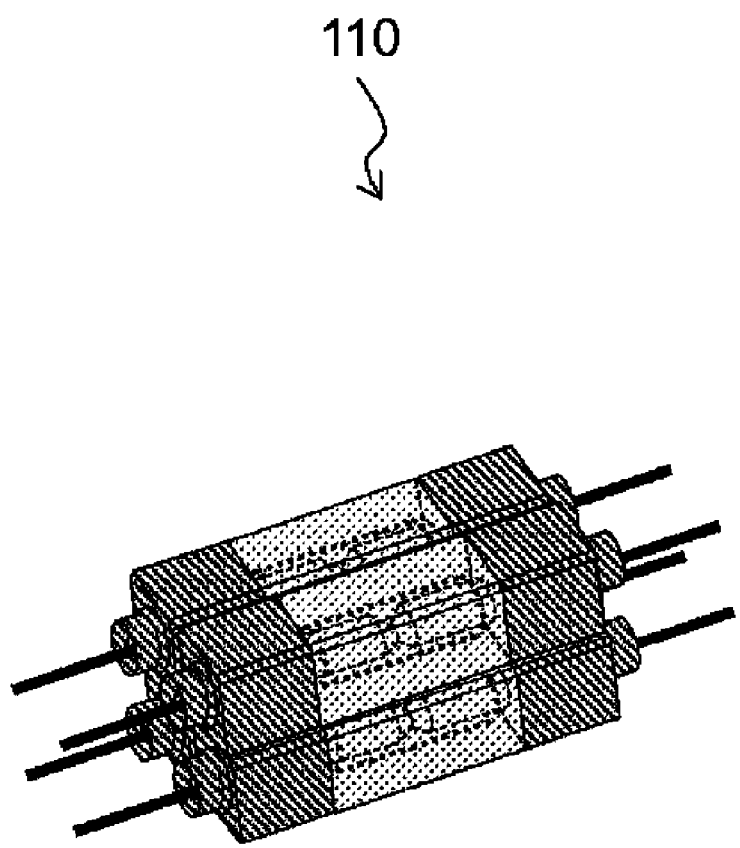
FIG. 5 is a perspective view of a modified example of the optical connector according to the first embodiment.

FIG. 5 illustrates the modified example of the optical connector according to the first embodiment. The present modified example is a multiple optical connector no in which the optical connectors 100 according to the first embodiment are connected in multiple connections. The magnetic force of the permanent magnet used for the connection component 105 makes it possible to connect the optical connectors 100 in multiple connections. In this way, by arranging and disposing the optical connectors 100 in multiple connections, the multiple optical connector no with no gaps can be provided.

Second Embodiment

Next, an optical connector 200 according to a second embodiment of the present invention will be described.

Figure 6:
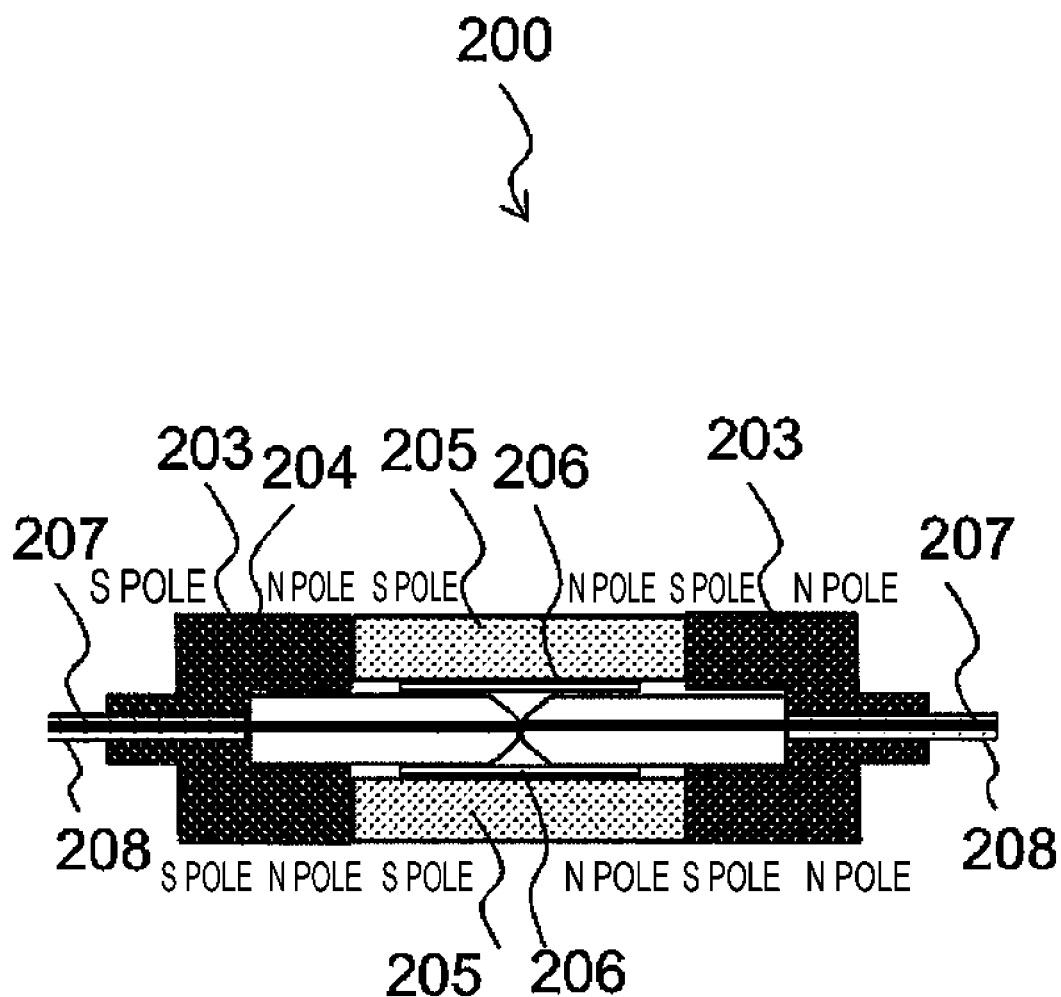
FIG. 6 is a cross-sectional view (A-A') of an optical connector according to a second embodiment of the present invention.

FIG. 6 illustrates a cross-sectional view (A-A') of the optical connector 200 according to the second embodiment of the present invention. A base configuration of the second embodiment is the same as that of the first embodiment, but here not only a connection component 205 is made of a permanent magnet, but also a flange 203 is made of a permanent magnet.

Here, the polarity of the flange 203 is magnetized in the A direction, and the polarities of the flanges 203 and the connection component 205 on the opposite surfaces are set to be opposite to each other such that the flange 203 and the connecting component 205 are combined to exert an attractive force by a magnet. That is, if one of the surfaces is an N pole, the other surface is an S pole. As a result, similarly to the effects in the first embodiment, by eliminating a mechanical pressing and holding structure, a small PC connection optical connector can be realized.

In addition, by forming the flange 203 with a magnet, the polarities between the connection component 205 and the flange 203 are determined, and thus a degree of freedom in selecting the polarities of the connection component 205 and the flange 203 is restricted. On the other hand, the effect that a larger attractive force caused by the magnets can be realized is achieved.

As described above, even when the sizes of the connection component 205 and the flanges 203 are made smaller, it is possible to realize a sufficient pressing force, and to provide a smaller optical connector and optical connection structure.

Third Embodiment

Figure 7:
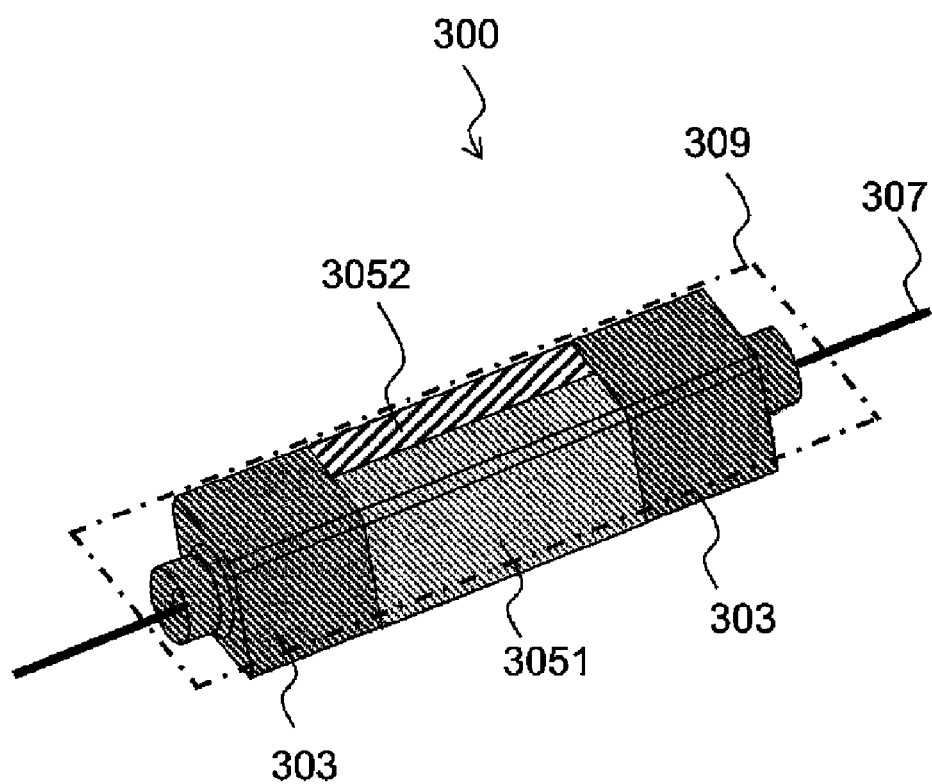
FIG. 7 is a perspective view of an optical connector according to a third embodiment of the present invention.
Figure 8:
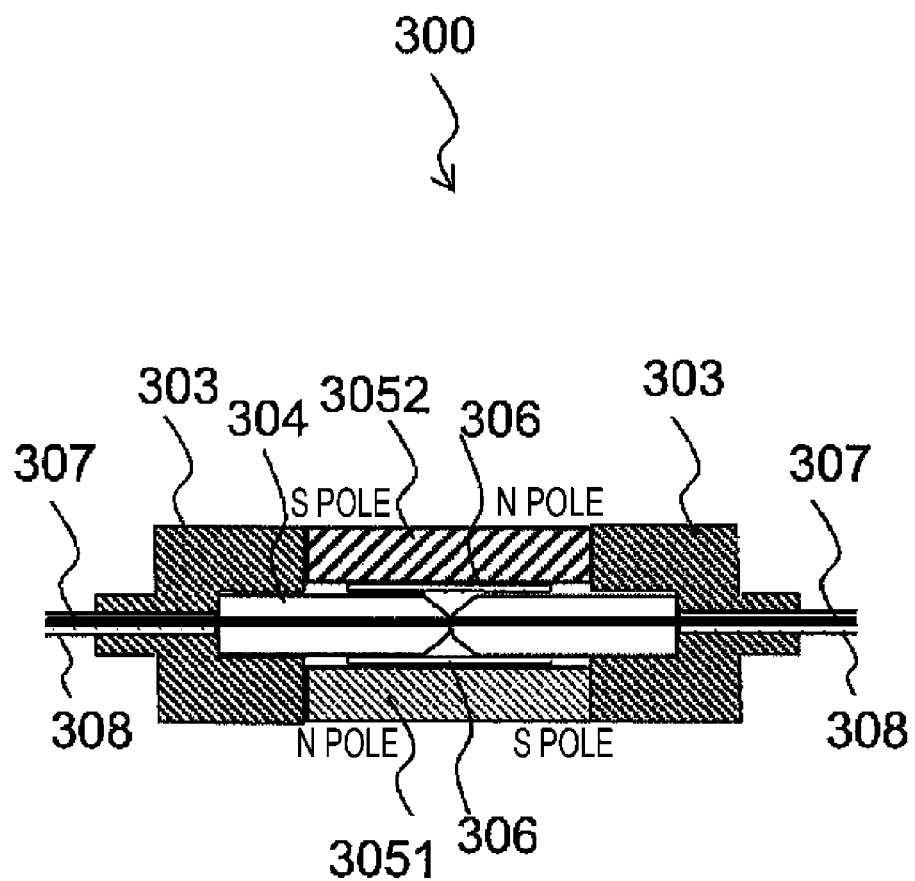
FIG. 8 is a cross-sectional view (A parallel plane) of the optical connector according to the third embodiment of the present invention.

FIG. 7 is a perspective view of the optical connector 300 according to the third embodiment of the present invention, and FIG. 8 is a cross-sectional view thereof on an A parallel plane 309 (indicated by a dot-dash line in FIG. 7). The configuration is substantially the same as that of the first embodiment, but a configuration of a connection component 305 is different.

The connection component 305 in the present embodiment has a half-split structure and is composed of a pair of halves 3051 and 3052. The half 3051 is magnetized in one direction of the A direction (the axial direction of the optical fiber), one end portion thereof (in the present embodiment, hereinafter, an end portion on a left side in FIG. 8) is an N pole, and the other end portion thereof (in the present embodiment, hereinafter, an end portion on a right side in FIG. 8) is an S pole. On the other hand, the polarity of the half 3052 is magnetized in a direction opposite to the magnetization direction of the half 3051 in the A direction (the axial direction of the optical fiber), on one end portion is an S pole, and the other end portion is an N pole.

As described above, the half 3051 and the half 3052 include a central axis of the optical connector 300 and are symmetrical in a plane perpendicular to the top surface (A cross-section), and opposing surfaces of the half 3051 and the half 3052 have opposite polarities.

According to this configuration of the connection component 305, similarly to the effects in the first embodiment, by eliminating a mechanical pressing and holding structure, a small PC connection optical connector can be realized. Further, a larger attractive force caused by the magnets can be realized.

As described above, even in the case of setting the sizes of the connection component 305 and the flanges 303 to be small, it is possible to realize a sufficient pressing force, and to provide a small-sized optical connector and an optical connection structure.

Here, in the present embodiment, the connection component 305 is divided in to two parts (half-split) consisting of a pair of halves 3051 and 3052, but it is necessary that the connection component 305 is divided into a plurality of parts and composed of pairs including a plurality of members (magnets) even if it is not a pair, and each paired members (magnets) have opposite polarities on opposing surfaces.

That is, the connection component 305 includes magnets having at least one or more pairs of N and s poles axisymmetrically along a direction orthogonal to the axial direction of the optical fiber, and opposing surfaces between the magnets are disposed to have opposite poles such that an attractive force acts on the magnets paired with the divided connection component.

Further, in the present embodiment, the connection component 305 is a rectangular parallelepiped, and the paired halves are symmetrical in a plane (A cross-section) that is perpendicular to the top surface including the central axis, but another plane may be a plane of symmetry as long as the half of the N pole and the half of the S pole are symmetrical, and the half of the N pole and the half of the S pole are disposed symmetrically. If the connection component 305 has a cylindrical shape, the plane including the central axis may be the plane of symmetry.

Fourth Embodiment

Next, an optical connector 400 according to a fourth embodiment of the present invention will be described.

Figure 9:
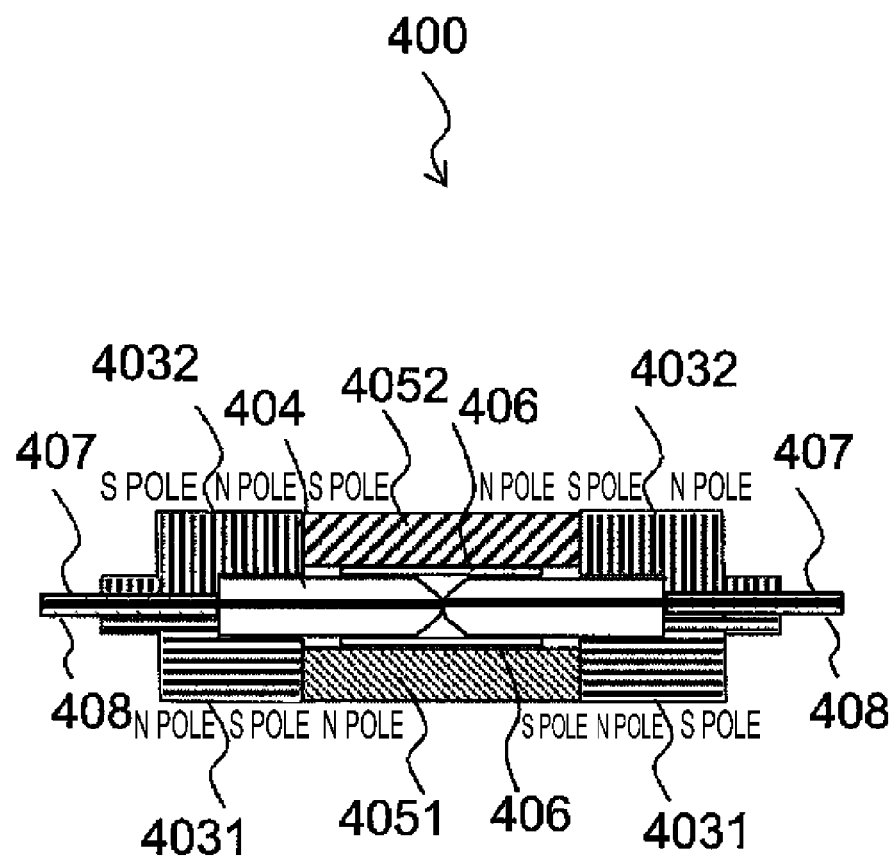
FIG. 9 is a cross-sectional view (A-A') of an optical connector according to a fourth embodiment of the present invention.

FIG. 9 is a cross-sectional view (A-A') of the optical connector 400 according to the fourth embodiment of the present invention. The configuration is substantially the same as that of the third embodiment, but permanent magnets are also used for flanges 403, and, similarly to a connection component 405, the flanges 403 each have a half-split structure configuration of a half 4031 and a half 4032 (in FIG. 9, in the half-split structure, the flange 403 is divided vertically).

Similarly to the third embodiment, in the connection component 405, the half 4051 is magnetized in one direction in the A direction (the axial direction of the optical fiber), one end portion of the half 4051 (in the present embodiment, hereinafter, an end portion on a left side in FIG. 9) is an N pole, and the other end portion of the half 4051 (in the present embodiment, hereinafter, an end portion on a right side in FIG. 9) is an S pole. On the other hand, polarity of the half 4052 is magnetized in a direction opposite to the magnetization direction of the half 4051 in the A direction (the axial direction of the optical fiber), one end portion of the half 4052 is an S pole, and the other end portion of the half 4052 is an N pole.

As described above, the half 4051 and the half 4052 include a central axis of the optical connector 400 and are symmetrical in a plane perpendicular to a top surface thereof (A cross-section), and opposing surfaces of the half 4051 and the half 4052 of the connection component 405 have opposite polarities.

On the other hand, in the flange 403, the half 4031 is magnetized in one direction in the A direction (the axial direction of the optical fiber), and one end portion of the half 4031 is an N pole and the other end of the half 4031 is an S pole. On the other hand, polarity of the half 4032 is magnetized in a direction opposite to the magnetization direction of the half 4031 in the A direction (the axial direction of the optical fiber), and one end portion of the half 4032 is an S pole and the other end of the half 4032 is an N pole.

As described above, the half 4031 and the half 4032 of the flange 403 include the central axis of the optical connector 400 and are symmetrical in a plane perpendicular to the top surface (A cross-section), and opposing surfaces of the half 4031 and the half 4032 have opposite polarities.

In the present configuration, on the opposing surfaces between the half 4031 and the half 4032 of the flange 403, the half 4031 has an N pole at one end portion and an S pole at the other end portion. In addition, the half 4032 has an S pole at one end portion and an N pole at the other end portion. This configuration causes an attractive force to act between the half 4031 and the half 4032 of the flange 403.

On the other hand, on the opposing surfaces between the half 4051 and the half 4052 of the connection component 405, the half 4051 has an N pole at one end portion and an S pole at the other end portion. In addition, the half 4052 has an S pole at one end portion and an N pole at the other end portion. This configuration causes an attractive force to act between the half 4051 and the half 4052 of the connection component 405.

Accordingly, according to the present configuration, an attractive force acts between the half 4031 and the half 4032 in the flange 403, and an attractive force also acts between the half 4051 and the half 4052 in the connection component 405.

Further, in the present configuration, on the opposing surfaces between the half 4031 of the flange 403 and the half 4051 of the connection component 405, the half 4031 has the S pole at the other end portion, and the half 4051 has the N pole at the one end portion. In addition, the half 4031 has the N pole at the one end portion and the half 4051 has the S pole at the other end portion. This configuration causes the attractive force to act between the half 4031 of the flange 403 and the half 4051 of the connection component 405.

On the other hand, on the opposing surfaces between the half 4032 of the flange 403 and the half 4052 of the connection component 405, the half 4032 has the N pole at the other end portion, and the half 4052 has the S pole at the one end portion. Further, the half 4032 has the S pole at the one end portion, and the half 4052 has the N pole at the other end portion. This configuration causes the attractive force to act between the half 4032 of the flange 403 and the half 4052 of the connection component 405.

Accordingly, according to the present configuration, since the polarities of the halves of the flange 403 and the connection component 405 on the opposing surfaces are set to be opposite, the attractive force acts between the flange 403 and the connection component 405.

In this way, since the half 4031 of the flange 403, the half 4051 of the connection component 405, or the half 4032 of the flange 403 and the half 4052 of the connection component 405 face each other, the attractive force of the magnets is greatest between the flange 403 and the connection component 405. As a result, a rotation angle around the axis between the flange 403 composed of the half 4031 and the half 4032 and the connection component 405 composed of the half 4051 and the half 4052 is defined.

For example, when a deviation occurs from a predetermined rotational angle about the axis at which the half 4031 of the flange 403 and the half 4051 of the connection component 405 or 4032 of the flange 403 and the half 4052 of the connection component 405 face each other, an attractive force between the S pole and the N pole is generated between the flange 403 and the connection component 405, and at the same time, repulsive forces between the S pole and the S pole and the N pole and the N pole are also generated at the angle (position) at which the deviation occurs. Due to actions of the attractive force and the repulsive forces, the flange 403 and the connection component 405 return to the original predetermined rotational angle about the axis, and thus the rotational angle between the flange 403 and the connection component 405 about the axis is stably defined.

With the configurations of the flange 403 and the connection component 405, similarly to the effects of the third embodiment, by eliminating a mechanical pressing and holding structure, a small PC connection optical connector can be realized. Further, a larger attractive force caused by the magnets can be realized, and it is possible to provide a further small optical connector and optical connection structure.

In addition, as described above, the attractive force of the magnets is greatest at the predetermined rotation angle about the axis at which the half 4031 of the flange 403 and the half 4051 of the connection component 405, or 4032 of the flange 403 and the half 4052 of the connection component 405 face each other, and thus the rotation angle about the axis between the flange 403 composed of the half 4031 and the half 4032 and the connection component 405 composed of the half 4051 and the half 4052 is stably defined.

Thus, in a case in which the optical fibers 407 are connected to each other using the optical connector 400 of the present embodiment, the optical fibers 407 can be connected by the optical connector 400 integrated in a state in which rotation angles in the axial direction between the optical fiber 407 and the ferrule 404 and between the ferrule 404 and the flange 403 are defined in advance, and thus it is possible to align the rotation angle in the axial direction between the optical fibers 407 of connection targets to connect them. As a result, even when polarization-maintaining optical fibers, multi-core optical fibers, or the like that require rotational alignment of the optical fibers 407 are used, the rotation angle in the axial direction can be easily aligned.

Here, in the present embodiment, the flange 403 is divided into two parts (half-split) consisting of a pair of halves 4031 and 4032, but it is necessary that the flange 403 is divided into a plurality of parts and composed of pairs including a plurality of members (magnets) even if it is not a pair, and each paired members (magnets) have opposite polarities on opposing surfaces. In addition, the connection component 405 is divided into two parts (half-split) consisting of a pair of halves 4051 and 4052, but it is necessary that the connection component 405 is divided into a plurality of parts and composed of pairs including a plurality of members (magnets) even if it is not a pair, and each paired members (magnets) have opposite polarities on opposing surfaces. Further, it is necessary that the flange 403 and the connection component 405 are disposed such that the opposing surfaces are opposite poles, whereby the attractive force acts between the flange 403 and the connection component 405.

That is, the flange 403 may include a magnet having at least one or more pairs of N and S poles axisymmetrically in a direction orthogonal to the axial direction of the optical fiber, the connection component 405 may include a magnet having at least one or more pairs of N and S poles axisymmetrically in the direction orthogonal to the axial direction of the optical fiber, and the opposing surfaces of the flange 403 and the connection component 405 may be disposed to be opposite poles such that the attractive force acts between the flange 403 and the connection component 405.

In addition, in the present embodiment, the connection component 405 is a rectangular parallelepiped, and the paired halves are symmetrical in a plane (A cross-section) perpendicular to the top surface including the central axis, but another plane may be a plane of symmetry as long as the half of the N pole and the half of the S pole are symmetrical, or the half of the N pole and the half of the S pole may be configured to be disposed symmetrically. A plane including the central axis may be a plane of symmetry as long as the connection component 405 has a cylindrical shape.

Fifth Embodiment

Next, an optical connection structure 500 according to a fifth embodiment of the present invention will be described.

Figure 10A:
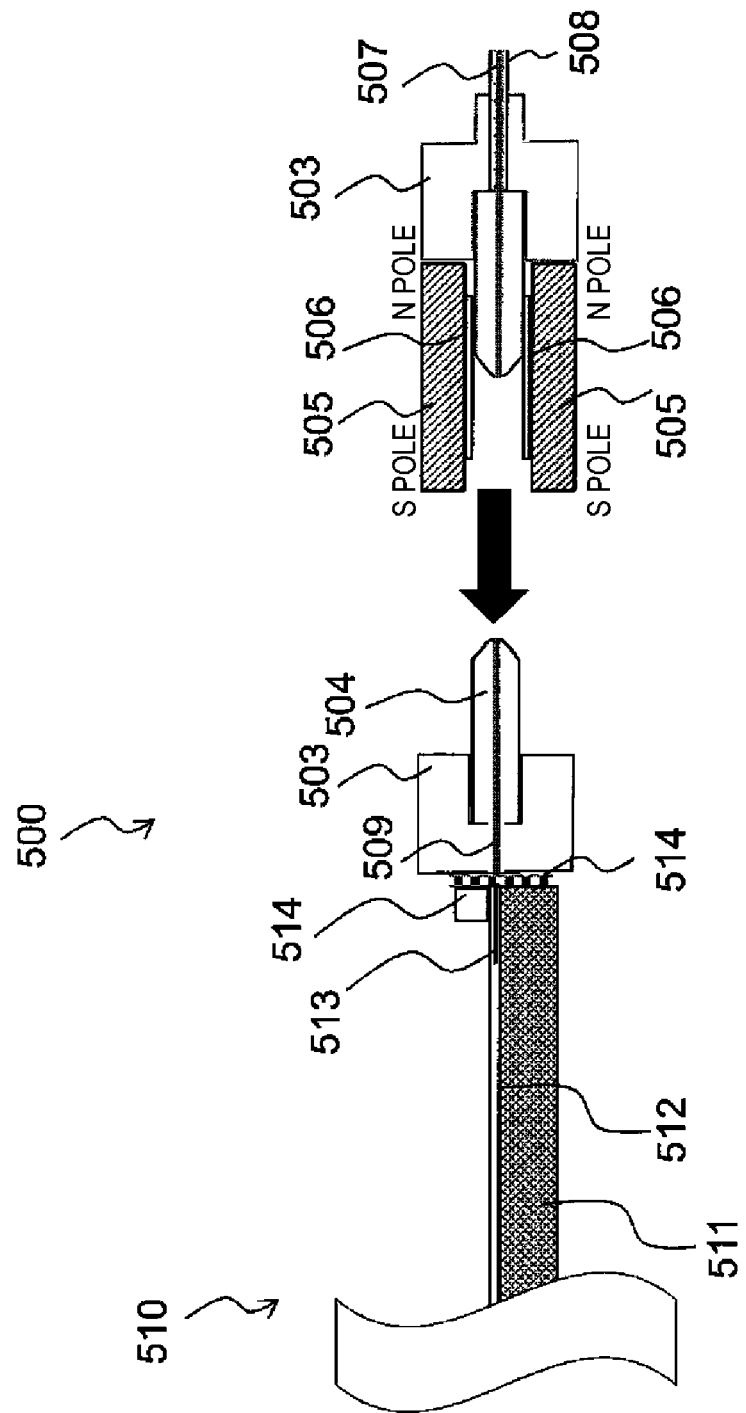
FIG. 10A is a cross-sectional view (A-A') before connection of an optical connection structure according to a fifth embodiment of the present invention.
Figure 10B:
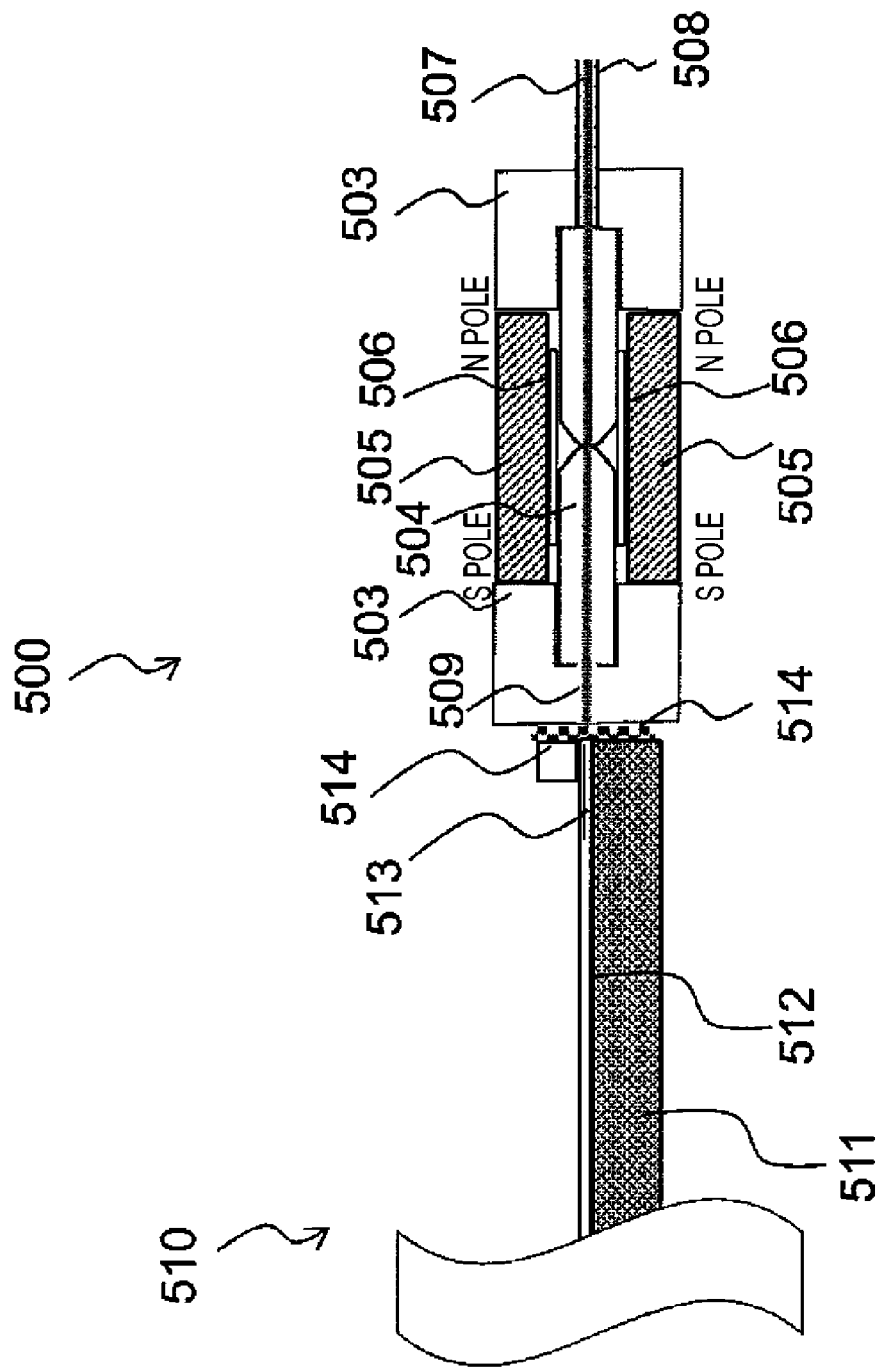
FIG. 10B is a cross-sectional view (A-A') after connection of the optical connection structure according to the fifth embodiment of the present invention.

FIG. 10A is a cross-sectional view before connection of the optical connection structure 500 according to the fifth embodiment of the present invention, and FIG. 10B is a cross-sectional view after connection. The configuration is substantially the same as that of the first embodiment, but a short optical fiber 509 at one end portion of an optical connector is connected and integrated with an optical waveguide device 510 with an adhesive 514, and a core 513 of the optical waveguide device and a core of the short optical fiber 509 are optically coupled at a low loss.

Here, the optical waveguide device is a planar lightwave circuit having a light propagation mechanism, a light emitting element, a light receiving element, a light modulating element, a light functional element (for example, a splitter, a wavelength coupling and splitting device, an optical switch, a polarized wave control element, and an optical filter), and the like. A material of the optical waveguide device is, for example, a semiconductor made of silicon, germanium, or the like, a group III-V semiconductor represented by indium phosphide (InP), gallium arsenide (GaAs), indium gallium arsenide (InGaAs), or the like, a ferroelectric material or a polymer such as lithium niobate, quartz glass, or the like.

With such a structure, a small optical connection structure can be realized. Further, by interposing the short optical fiber 509, it is possible to provide a small optical connector connection between the optical waveguide device and the optical fiber in a pseudo manner.

Modified Example of Fifth Embodiment

Next, a modified example of the fifth embodiment of the present invention will be described.

Figure 11A:
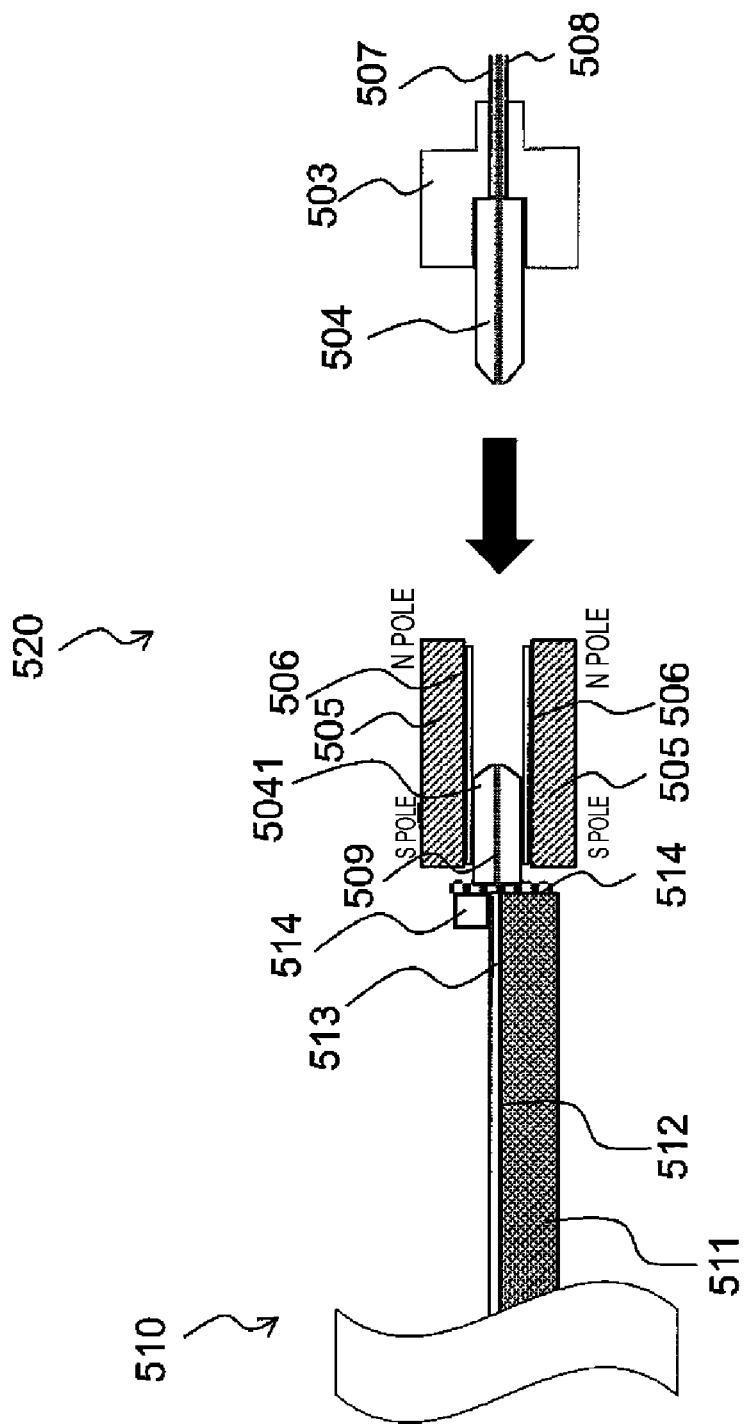
FIG. 11A is a cross-sectional view (A-A') before connection of an optical connection structure according to a modified example of the fifth embodiment of the present invention.
Figure 11B:
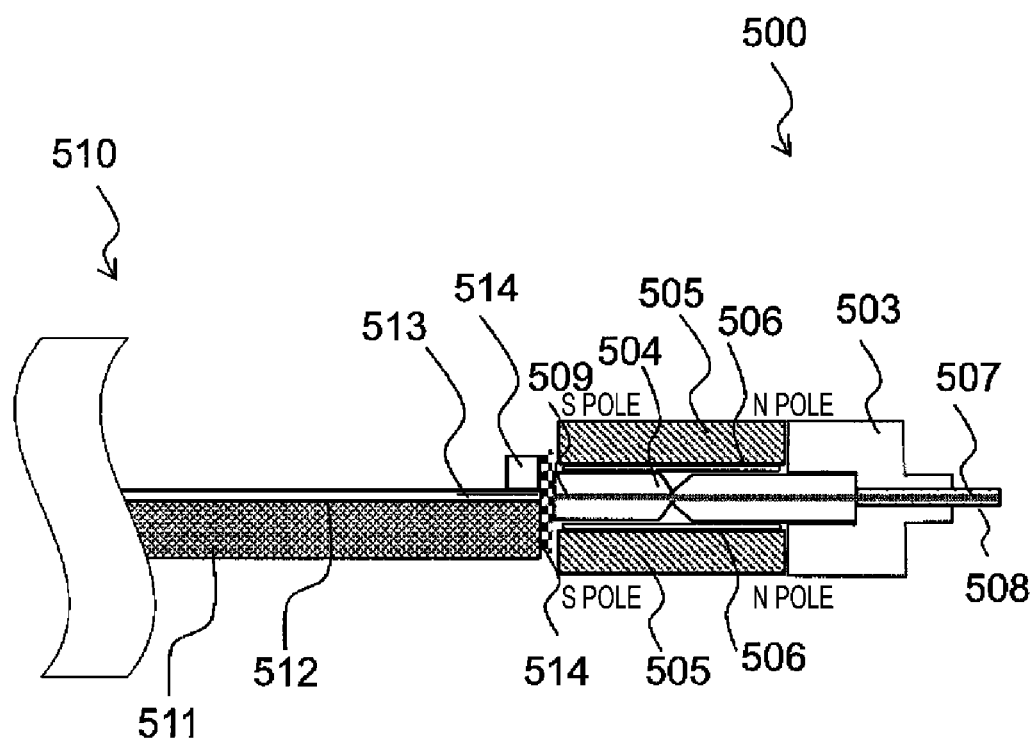
FIG. 11B is a cross-sectional view (A-A') after connection of the optical connection structure according to the modified example of the fifth embodiment of the present invention.

FIG. 11A is a cross-sectional view before connection of an optical connection structure 520 according to a modified example of the fifth embodiment of the present invention, and FIG. 11B is a cross-sectional view after connection. The configuration is substantially the same as that of the fifth embodiment, but a flange on a side connected to the optical waveguide device 510 is omitted. As a result of the above, a smaller optical connection structure can be realized.

In the present modified example, a connection component 505 is fixed to a short optical fiber ferrule 5041 via a sleeve 506 into which the ferrule 504 is inserted, but the connection component 505 may also be adhesively fixed to the optical waveguide device 510. Also, the connection component 505 may be in a state in which it is fixed and bonded to either the flange 503 in advance, or they may be fixed and bonded via the connection component 505 at the time of connection.

In addition, any of the first to fourth embodiments may be used for the optical connector used in the present embodiment and the modified example.

Sixth Embodiment

Next, an optical connection structure 600 according to a sixth embodiment of the present invention will be described.

Figure 12A:
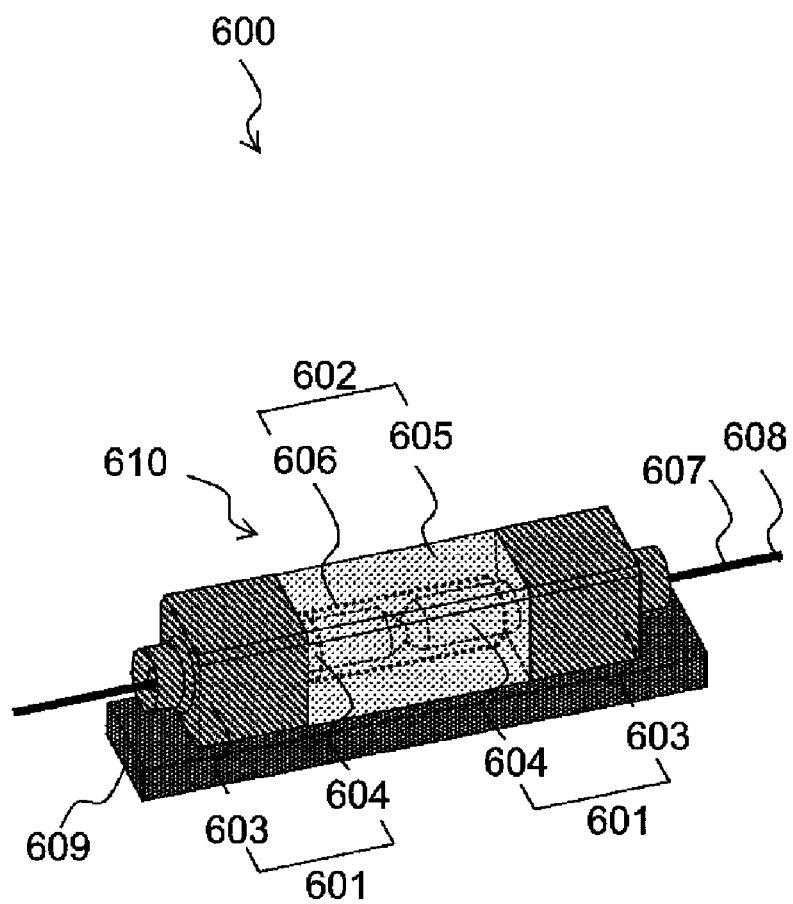
FIG. 12A is a perspective view of an optical connection structure according to a sixth embodiment of the present invention.

FIG. 12A is a perspective view of the optical connection structure 600 according to the sixth embodiment of the present invention. The optical connection structure 600 according to the present embodiment is composed of an optical connector 610 and a plate 609.

The plate 609 is disposed to be in contact with one surface of an outer peripheral portion of each of the flange 603 and the connection component 605 of the optical connector 610. A shape of the plate 609 is rectangular and is substantially the same size as the optical connector 610 (one surface of the outer peripheral portion including the flange 603 and the connection component 605). The plate is made of a metal or other magnetic material. For example, it is a SUS430 plate.

With the optical connection structure according to the present embodiment, a small optical connection structure can be realized as in the fifth embodiment. Further, since magnetic field lines are confined by the plate 609, an attractive force caused by magnets can be further enhanced, and a smaller optical connector and optical connection structure can be provided.

Also, by using the plate as a magnetic material, the influence of a magnetic force on the outside can be reduced, and the effects that adsorption of magnets to surrounding members can be prevented, and adverse effects caused by the magnetic field can be eliminated are also achieved.

Modified Example of Sixth Embodiment

Next, a modified example of the sixth embodiment of the present invention will be described.

Figure 12B:
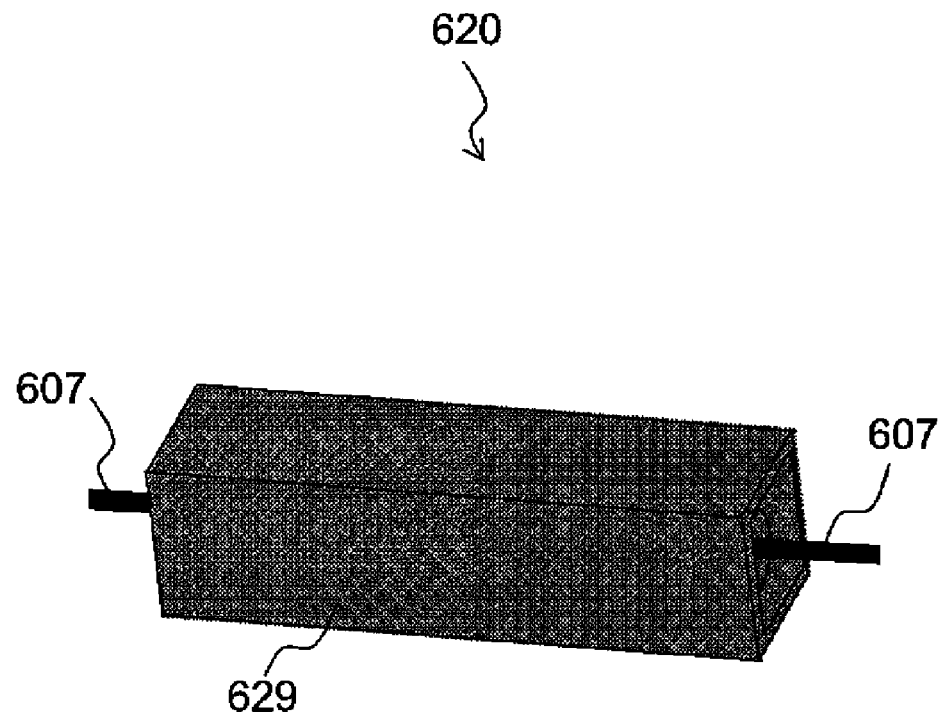
FIG. 12B is a perspective view of an optical connection structure according to a modified example of the sixth embodiment of the present invention.

FIG. 12B is a perspective view of an optical connection structure 620 according to the modified example of the sixth embodiment of the present invention. The optical connection structure 620 according to the present embodiment has the same configuration as the optical connection structure 600 described above, but the difference is that a plate 629 is disposed to be in contact with four surfaces of an outer peripheral portion of each of the flange 603 and the connection component 605 of the optical connector 610.

Since it is covered with the plate 629 on the four surfaces as compared to the optical connection structure 600, the effect of confining the magnetic field lines is large, the attractive force caused by the magnets can be further enhanced, and a smaller optical connector and optical connection structure can be provided.

In addition, by using the plate as a magnetic material, the influence of the magnetic force on the outside can be reduced, and the effects that adsorption of magnets to surrounding members can be prevented, and adverse effects caused by the magnetic field can be eliminated also increase.

In the present embodiment and the modified example thereof, the configuration in which the plate is disposed on one or four surfaces of the outer peripheral portion of the optical connector 610, but it is not limited to one surface or four surfaces and may be disposed to be in contact with at least one or more surfaces of the outer peripheral portion of each of the flange 603 and the connection component 605 of the optical connector 610.

In the present embodiment and the modified example thereof, a size of the plate 609 is substantially equal to a size of the optical connector 610 (one surface of the outer peripheral portion of the flange 603 and the connection component 605), but it may be larger than the optical connector 610.

In addition, in the present embodiment and the modified example thereof, even in a case in which outer shape sizes of the flange 603 and the connection component 605 are different, it can be used in the same way by forming the shape of the plate to have a stepped shape or the like to conform to the outer shape of each of the flange 603 and the connection component 605. Further, in a case in which the multiple optical connector according to the modified example of the first embodiment is used, a plate that surrounds the multiple optical connector and is sized to come into contact with an outer peripheral portion thereof may be used.

Also, any of the first to fourth embodiments may be used for the optical connector used in the present embodiment and the modified example.

Seventh Embodiment

Next, an optical connection structure 700 according to a seventh embodiment of the present invention will be described.

Figure 13:
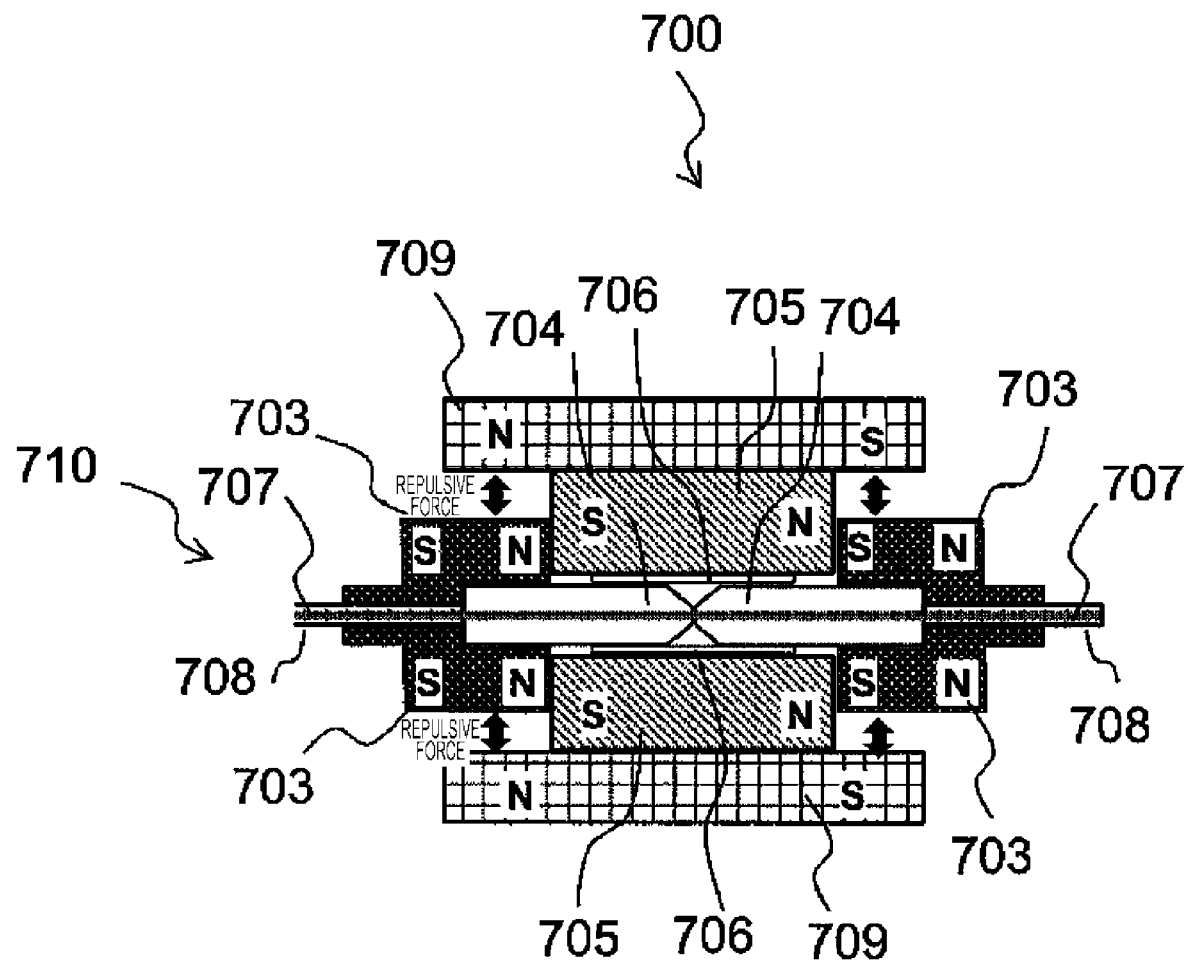
FIG. 13 is a cross-sectional view (A-A') of an optical connection structure according to a seventh embodiment of the present invention.

FIG. 13 is a cross-sectional view of the optical connection structure 700 according to the seventh embodiment of the present invention. The structure is substantially the same as that of the sixth embodiment, but differs from the sixth embodiment in that a permanent magnet is used for a plate 709. Further, a cross-sectional area of a flange 703 is set to be smaller than a cross-sectional area of a connection component 705. In addition, the plate 709 is disposed to surround an outer periphery of an optical connector 710, substantially similarly to the modified example of the sixth embodiment illustrated in FIG. 12B.

The plate 709 is disposed in the vicinity of the connection component 705, is in contact with the connection component 705 on at least one or more surfaces thereof, and is set such that a gap is generated on any surface of the flange 703.

Further, in the plate 709, an N pole and an S pole are magnetized at predetermined positions to generate an attractive force with the connection component 705. On the other hand, the N pole and the S pole are magnetized at predetermined positions to generate a repulsive force with the flange 703.

According to the optical connection structure 700 according to the present embodiment, a small optical connection structure can be realized as in the fifth and sixth embodiments.

Furthermore, the following effects are achieved. In the present structure, since a repulsive force can be generated between the plate 709 and the flange 703, the flange 703 receives a balanced force so that it is centrally located between the plates 709. Thus, even when an external force is applied to the plate 709 and the plate 709 deforms, the deviation that occurs in the positional relationship between the flange 703 and the connection component 705 can be inhibited, and thus the attractive force between the flange 703 and an optical connector adapter 702 (the connection component 705 and a sleeve 706) can be stably applied. Accordingly, a mechanically stable PC connection can also be achieved with a small optical connection structure.

In the present embodiment, the configuration in which the plate is disposed to surround the outer periphery of the optical connector 710 is shown, but it is not limited to the configuration of surrounding the four surfaces of the outer periphery and may be disposed to be in contact with at least one or more surfaces of the outer peripheral portion of each of the flange 703 and the connection component 705 of the optical connector 710.

In the present embodiment, a size of the plate 709 may be substantially equal to a size of the optical connector 710 (one surface of the outer peripheral portion including the flange 703 and the connection component 705) or larger than the optical connector 710.

In addition, in the present embodiment and the modified example thereof, even in a case in which outer shape sizes of the flange 703 and the connection component 705 are different, it can be used in the same way by forming the shape of the plate to have a stepped shape or the like to conform to the outer shape of each of the flange 703 and the connection component 705. Further, in a case in which the multiple optical connector according to the modified example of the first embodiment is used, a plate that surrounds the multiple optical connector and is sized to come into contact with an outer peripheral portion thereof may be used.

Eighth Embodiment

Next, an optical connector 800 according to an eighth embodiment of the present invention will be described.

Figure 14:
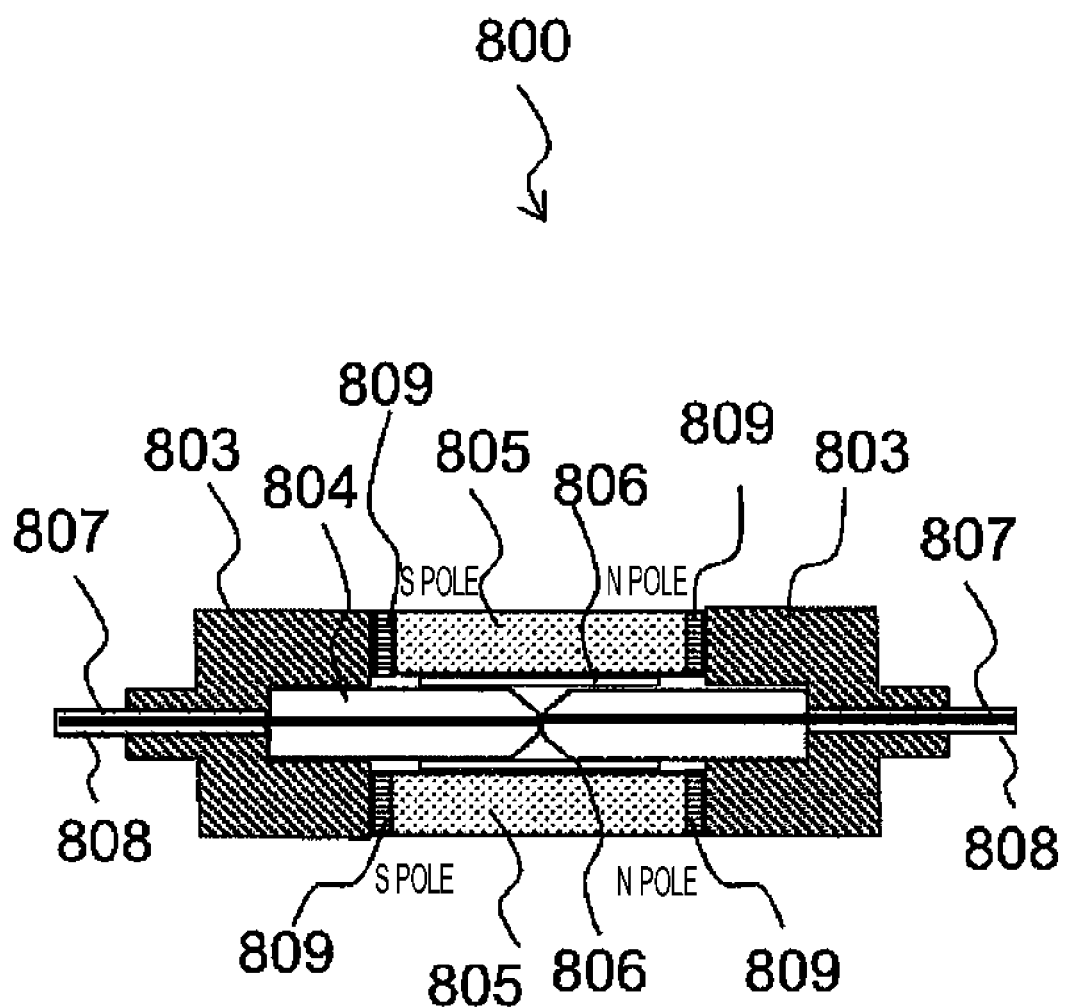
FIG. 14 is a cross-sectional view (A-A') of an optical connector according to an eighth embodiment of the present invention.

FIG. 14 is a cross-sectional view of the optical connector 800 according to the eighth embodiment of the present invention. The structure is almost the same as that of the first embodiment, but a foil 809 made of a magnetic material is inserted between a flange 803 and a connection component 805. For example, the foil 809 made of a magnetic material is a donut-shaped SUS430 shim ring foil.

According to the optical connector 800 according to the present embodiment, a small optical connection structure can be realized as in the fifth to seventh embodiments.

Further, since the magnetic material fills a gap between the flange 803 and the connection component 805, the gap can be effectively reduced. Accordingly, in a case in which the gap between the flange 803 and the connection component 805 is large, it is possible to inhibit a decrease in attractive force by filling the gap with a magnetic material.

Ninth Embodiment

Next, an optical connector 900 according to a ninth embodiment of the present invention will be described.

Figure 15:
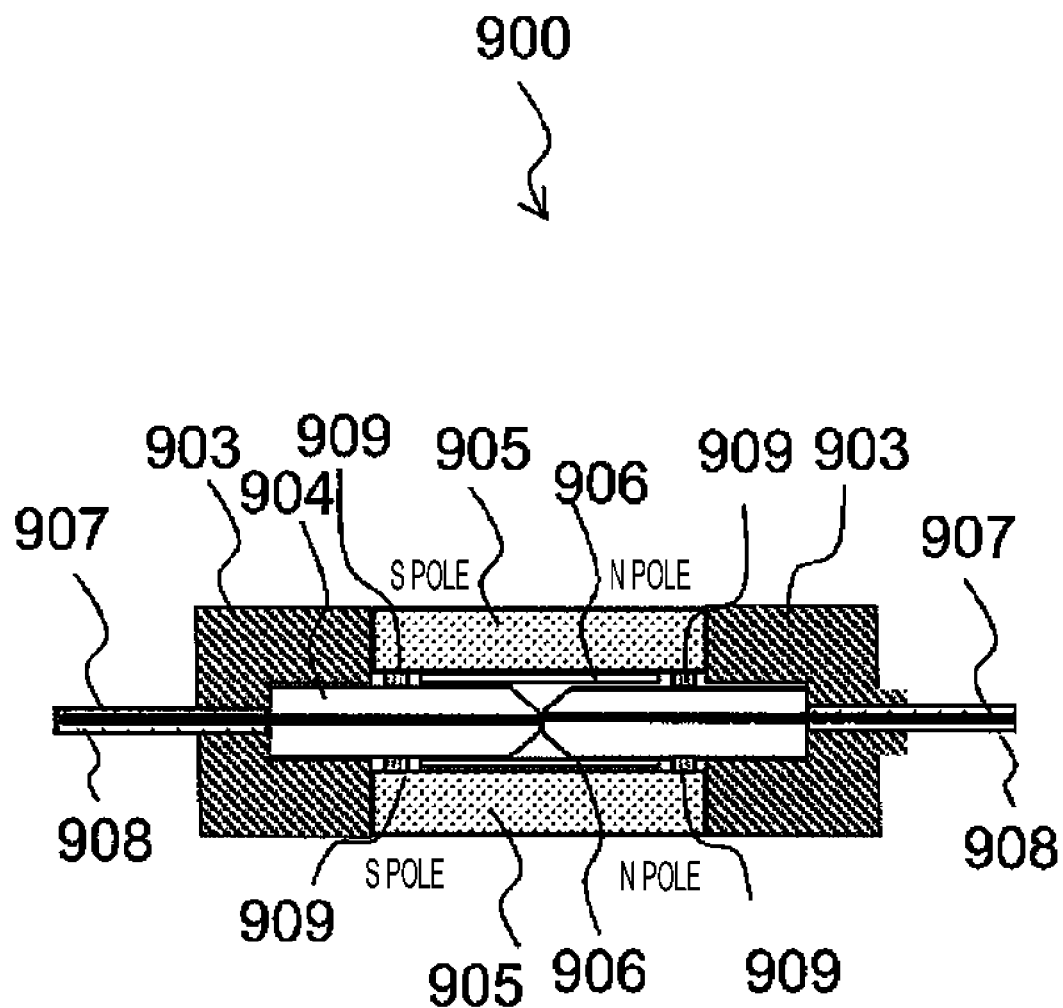
FIG. 15 is a cross-sectional view (A-A') of an optical connector according to a ninth embodiment of the present invention.

FIG. 15 is a cross-sectional view of the optical connector 900 according to the ninth embodiment of the present invention. The structure is substantially the same as that of the first embodiment, but a circular SUS foil 909 having an opening through which a ferrule 904 is passed is sandwiched at an end portion of a connection component 905. By sandwiching the SUS foil 909, one region of an inner diameter of a hole containing a sleeve 906 inside the connection component 905 can be effectively reduced.

According to the optical connector 900 according to the present embodiment, a small optical connection structure can be realized as in the fifth to eighth embodiments. Further, the sleeve 906 can be prevented from falling off from the connection component 905, and the operability can be increased.

In the present embodiment, the circular SUS foil having the opening was used, but the shape is not limited thereto. The structure is arbitrary as long as it achieves the same effect to prevent the sleeve 906 from falling off. For example, protrusion structures may be provided on both end portions of a hole in the connection component 905. Alternatively, a donut-shaped SUS430 shim ring foil may be attached to both ends of the connection component 905. That is, a similar effect can be achieved by having a mechanism (hereinafter referred to as a "sleeve falling prevention mechanism") that can set the opening (diameter) of the hole inside the effective connection component 905 to be smaller than an outer diameter of the sleeve 906 and larger than an outer diameter of the ferrule 904.

In embodiments according to the present invention, permanent magnets are used for the connection component, the flange, and the plate, but the present invention is not limited to the permanent magnets. A magnetic force can be maintained for a predetermined period of time, even if the magnets are not magnets that are not permanent magnets. Considering that the optical connector according to embodiments of the present invention is mainly applied to an optical communication system or the like, magnets that can maintain a magnetic force of about 1 N or more for at least 10 years may be used as described above.

In embodiments according to the present invention, the configuration in which the entire of each component in the connection component, the flange, and the plate is made of a magnet or a magnetic material, but the embodiments of the present invention are not limited thereto. Even with a configuration in which a part of each component contains a magnet or a magnetic material, the same effect can be achieved as long as each component has a structure in which an attractive force or a repulsive force caused by a magnet or a magnetic material acts and functions.

Although the influence of external force is large under the environment used conventionally, and the mechanism for resisting the external force is emphasized in the optical connector and optical connection structure according to embodiments of the present invention, the use in the environment in which the influence of external force is small has increased in recent years, and thus reduction in size has become more important than resisting the external force. As a result, in the optical connector according to embodiments of the present invention, a structure is adopted in which the effect of resisting the external force is small, but magnets significantly influencing the reduction in size is used.

The optical connection structure according to the seventh embodiment of the present invention realizes reduction in size by adopting a structure using magnets, and achieves a significant effect of resisting an external force.

In addition, in embodiments of the present invention, an example has been shown in which the shapes of the flange and the connection component are formed into a rectangular parallelepiped having a square cross-section, but any arbitrary shape can be used therefor. For example, the cross-sectional shape may be rectangular or polygonal, and the cross-sectional shape may be a circular shape or an elliptical cylindrical shape.

Although the dimensions of the constituent portions, components, and the like of the optical connectors and the optical connection structures according to the first to ninth embodiments of the present invention have been described, but the size is not limited thereto, and any size may be used as long as each constituent portion, component, and the like function.

INDUSTRIAL APPLICABILITY

Embodiments of the present invention relates to a small optical connector and an optical connection structure and can be applied to a device system for optical communication and the like.

REFERENCE SIGNS LIST

100 Optical connector
101 Optical connector plug
102 Optical connector adapter
103 Flange
104 Ferrule
105 Connection component
106 Sleeve
107 Optical fiber.

The invention claimed is:

1. An optical connector configured to connect a plurality of optical fibers each having a waveguide core surrounded by a clad so as to face each other, the optical connector comprising:
a ferrule configured to accommodate the plurality of optical fibers, the ferrule having a cylindrical shape and a guide hole;
a flange disposed on an optical fiber extraction side at one end of the guide hole and integrated with the ferrule; and
a sleeve in which a pair of the ferrules are accommodated to face each other such that central axes of the ferrules coincide with each other;
a connection component around the sleeve, the connection component including a magnet or a metallic magnetic material; and
a plate disposed to come into contact with at least one or more surfaces of an outer peripheral portion of a pair of the flanges and an outer peripheral portion of the connection component, the flange and the connection component being connected to each other,
wherein the plate includes a magnet or a metallic magnetic material, at least one of the connection component and the flange includes a magnet, a length of the connection component with respect to an axial direction of the optical fiber is set to be the same as or a predetermined distance shorter than a sum of lengths of two of the ferrules protruding from the flanges, and due to an attractive force acting on the connection component and the flange, cores of the plurality of optical fibers facing each other come in close contact with each other, a gap is provided between an inner wall portion of the plate and an outer wall portion of the flange, and opposing surfaces of the plate and the flange are disposed to be the same poles such that a repulsive force acts between the plate and the flange.

2. The optical connector according to claim 1,
wherein the connection component includes a magnet having an N pole and an S pole in an axial direction of an optical fiber, the flange includes a metallic magnetic material, and
the connection component and the flange are disposed such that an attractive force acts on the connection component and the flange.

3. The optical connector according to claim 1,
wherein the connection component includes a magnet having an N pole and an S pole in an axial direction of the optical fiber, the flange includes a magnet having an N pole and an S pole in the axial direction of the optical fiber, and opposing surfaces of the connection component and the flange are disposed to be opposite poles such that an attractive force acts on the connection component and the flange.

4. The optical connector according to claim 1,
wherein the connection component includes a magnet having at least one or more pairs of N and S poles axisymmetrically in a direction orthogonal to the axial direction of the optical fiber, the flange includes a metallic magnetic material, and
the connection component and the flange are disposed such that an attractive force acts on the connection component and the flange.

5. The optical connector according to claim 1,
wherein the connection component includes a magnet having at least one or more pairs of N and S poles axisymmetrically in a direction orthogonal to the axial direction of the optical fiber, the flange includes a magnet having at least one or more pairs of N and S poles axisymmetrically in the direction orthogonal to the axial direction of the optical fiber, and opposing surfaces of the connection component and the flange are disposed to be opposite poles such that an attractive force acts on the connection component and the flange.

6. The optical connector according to claim 1,
wherein a sleeve falling prevention mechanism is provided in a gap between one surface of the connection component and one surface of the flange on which an attractive force acts.

7. An optical connection structure, comprising:
an optical connector configured to connect a plurality of optical fibers so as to face each other, each of the plurality of optical fibers having a waveguide core surrounded by a clad, the optical connector comprising:

a ferrule configured to accommodate the plurality of optical fibers, the ferrule having a cylindrical shape and a guide hole;

a flange disposed on one end of the guide hole and integrated with the ferrule; and a sleeve in which a pair of the ferrules are accommodated to face each other such that central axes of the ferrules coincide with each other, wherein a connection component including a magnet is provided around the sleeve, a length of the connection component with respect to an axial direction of the optical fiber is set to be the same as or a predetermined distance shorter than a sum of lengths of two of the ferrules protruding from the flanges; and a plate disposed to surround an outer peripheral portion of the connection component, wherein the plate includes a magnet, opposing surfaces of the plate and the connection component are disposed to be opposite poles such that an attractive force acts on each of the plate and the connection component, a gap is provided between an inner wall portion of the plate and an outer wall portion of the flange, and opposing surfaces of the plate and the flange are disposed to be the same poles such that a repulsive force acts between the plate and the flange.

8. The optical connection structure to claim 7,
wherein the connection component includes a magnet having an N pole and an S pole in an axial direction of the optical fiber, the flange includes a magnet having an N pole and an S pole in the axial direction of the optical fiber, and opposing surfaces of the connection component and the flange are disposed to be opposite poles such that an attractive force acts on the connection component and the flange.

9. The optical connection structure according to claim 7,
wherein the connection component includes a magnet having at least one or more pairs of N and S poles axisymmetrically in a direction orthogonal to the axial direction of the optical fiber, the flange includes a metallic magnetic material, and
the connection component and the flange are disposed such that an attractive force acts on the connection component and the flange.

10. The optical connection structure according to claim 7,
wherein the connection component includes a magnet having at least one or more pairs of N and S poles axisymmetrically in a direction orthogonal to the axial direction of the optical fiber, the flange includes a magnet having at least one or more pairs of N and S poles axisymmetrically in the direction orthogonal to the axial direction of the optical fiber, and opposing surfaces of the connection component and the flange are disposed to be opposite poles such that an attractive force acts on the connection component and the flange.

11. The optical connection structure according to claim 7,
wherein due to an attractive force acting on the connection component and the flange, cores of the plurality of optical fibers facing each other come in close contact with each other.

12. The optical connector according to claim 1, wherein the plate surrounds an outer peripheral portion of the connection component, and wherein opposing surfaces of the plate and the connection component are disposed to be opposite poles such that an attractive force acts on each of the plate and the connection component.

13. The optical connector according to claim 1, wherein the plate includes a magnet and not a metallic magnetic material.

14. The optical connector according to claim 1, wherein the predetermined distance is equal to or less than 0.3 mm.

* * * * *